United States Patent Office 3,318,908
Patented May 9, 1967

3,318,908
3-CYANOPYRROLIDINES
John Swidinsky, Newark, and Bernard Beau Brown, Westfield, N.J., assignors to A. H. Robins Company, Incorporated, Richmond, Va., a corporation of Virginia
No Drawing. Filed Oct. 7, 1965, Ser. No. 493,887
14 Claims. (Cl. 260—326.62)

This application is a continuation-in-part of copending application Ser. No. 202,971, filed June 18, 1962, and now abandoned.

This invention relates to compounds derived from 3-pyrrolidinols and more particularly to 3-cyanopyrrolidines having the formula:

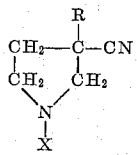

wherein R may be hydrogen or a dilower-alkylaminolower-alkyl, aralkyl, or heterocyclic group and X may be hydrogen or an aliphatic, aromatic, or alicylic radical.

The novel compounds of this invention are prepared from 1-hydrocarbon-substituted-3-halopyrrolidines by reaction with cyanide salts according to the following Equation I:

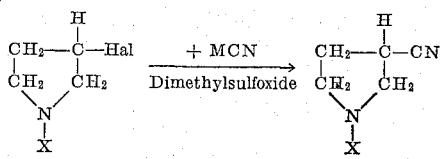

where MCN is a cyanide salt of an alkali metal, M.

The 3-halopyrrolidines are preferably the chloro, bromo, or iodo pyrrolidines and may be prepared by halogenating the appropriate 1-hydrocarbon substituted 3-pyrrolidinols. One method for the preparation of some of these halopyrrolidinols is described in U.S. Patent 2,830,997.

The 1-hydrocarbon-substituted-3-R-3-cyanopyrrolidines are prepared by alkylation of the 3-hydrogen of the 3-cyanopyrrolidine obtained from the above reaction (Equation I) with an R-halide (with R as represented above) in the presence of sodamide and liquid ammonia according to the following Equation II:

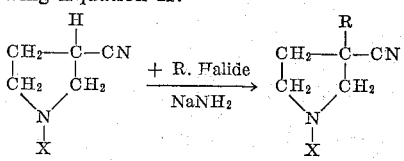

Many of the compounds of this invention form characteristic complexes with copper and silver and are useful for segregating same in solution. In addition they are useful intermediates for the preparation of several classes of pharmaceutically active compounds.

Other than hydrogen, representative substituents at the 1-position of the pyrrolidine nucleus are alkyl, aryl and aralkyl hydrocarbon radicals. Among the alkyl radicals, which preferably contain up to a maximum of six carbon atoms, are methyl, ethyl propyl, cyclopentyl, and cyclohexyl: the aryl radicals include phenyl, naphthyl, tolyl, and xylyl; and the aralkyl radicals include benzyl and phenethyl radicals.

The R substituents within the scope of this invention are cycloalkyl, aralkyl, tertiary-amino alkyl, and heterocyclic radicals such as benzyl, cyclopentyl, dimethylaminoethyl, phenethyl, 1-methyl-3-pyrrolidinyl, cyclohexyl and the like. Many of these compounds are cholinesterase inhibitors and have insecticidal qualities.

The compounds having the formula:

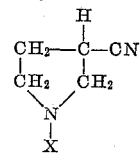

where X is methyl or other lower-alkyl, or otherwise as previously indicated, are useful intermediates for the preparation of certain 1-alkyl-3-pyrrolidinemethanols used in the synthesis of antispasmodics. These 1-alkyl-3-pyrrolidinemethanol intermediates and final products are described in the J. Org. Chem. 26, pgs. 1529 and 1524 (1961). By way of example, the 1-methyl-3-pyrrolidinenitrile of this invention is first hydrogenated to the respective amine and is then readily diazotized and hydrolized to the alcohol, 1-methyl-3-pyrrolidinemethanol, according to the following reaction scheme:

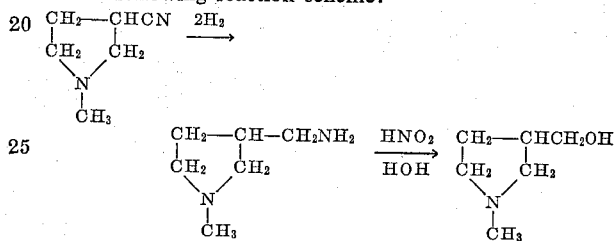

The 1-substituted (e.g., lower-alkyl)-3-pyrrolidinemethanols and the corresponding compounds which have a further 3-substituent, which are prepared in the manner as indicated in the foregoing reaction sequence from the nitriles of the present invention, in which the 3 carbon atom of the pyrrolidine ring is substituted not only by the nitrile radical but also by either hydrogen or a further radical, wherein the substituent in the three position in addition to the nitrile group may be, for example, benzyl, phenethyl, cyclopentyl, cyclohexyl, 2-dimethylaminoethyl or other dilower-alkylaminolower-alkyl radical, or 1'-lower-alkyl-3'-pyrrolidyl, may be reacted with a methylbenzilate in the presence of metallic sodium in an n-heptane medium to produce the corresponding 1-substituted-3-pyrrolidyl methylbenzilates, and thence if desired to the pharmacologically acceptable acid addition salts thereof, which compounds are useful as antispasmodics either in the form of the free base or as acid addition or quaternary ammonium salts thereof.

These 1-substituted (e.g., lower-alkyl)-3-pyrrolidine methanols may also be reacted with benzilic acid to produce the corresponding ester of benzilic acid, either by reaction with a lower-alkyl ester of benzilic acid in the presence of metallic sodium or other alkaline catalyst in a solvent such as benzene or toluene or by reaction of the benzilic acid chloride with the 1-substituted-3-pyrrolidyl methanol under anhydrous conditions in a non-reactive solvent such as methylene chloride. The compounds produced in this manner are central nervous system drugs, especially central parasympathetic suppressants useful as ataractic agents.

In addition, the 1-substituted (e.g., lower-alkyl)-3-pyrrolidine nitriles of the invention and the corresponding compounds having a further substituent in the three position, wherein the substituent in the three position in addition to the nitrile group may be, for example, hydrogen, benzyl, phenethyl, cyclopentyl, cyclohexyl, 2-dimethylaminoethyl or other dilower-alkylaminolower-alkyl radical, or 1'-lower-alkyl-3'-pyrrolidyl, may be hydrolized with acid to produce the corresponding 1-substituted-3-pyrrolidine carboxylic acid which may then be reacted with aniline or aniline derivatives to produce amides which are local anesthetics.

Further, several other series of novel derivatives may also be prepared from these new compounds including some having analgesic properties and others having sedative-enhancing qualities.

Some of the 1-hydrocarbon-substituted-3-halopyrrolidines which are the starting materials for the cyanopyrrolidines of this invention are novel and their preparation will also be described.

For specific insight into the type of reactions involved, the intermediates therefor, and the manner of carrying them out, and the novel compounds, some of these are specifically set forth in a series of specific examples which follows:

PREPARATION OF 1-METHYL-3-BROMO-PYRROLIDINE

Dissolve 1-methyl-3-pyrrolidinol in dry benzene and cool in an ice bath. To this solution, add a 25% molar excess of phosphorous tribromide. Stir for a short period of time and then reflux for about two hours. Cool the reaction mixture and slowly add a 25% solution of potassium hydroxide at such rate that the reaction-mixture temperature does not exceed the reflux temperature of the benzene. Separate the benzene layer and extract the aqueous layer with successive portions of benzene. Discard the aqueous layer and combine the benzene solutions. Distill off the benzene and then distill 1-methyl-3-bromopyrrolidine at 78–80° centigrade at 40 mm./Hg.

In an analogous manner but using $PCl_3$, 1-methyl-3-chloropyrrolidine and 1-ethyl-3-chloropyrrolidine are prepared. The former boils at 45–60° centigrade at 40 mm./Hg and the latter at 157–159° centigrade at 760 mm./Hg.

Example 1.—1-methyl-3-cyanopyrrolidine

Add one mol of 1-methyl-3-bromopyrrolidine to 1.1 mol of potassium cyanide in one-quarter liter of dimethylsulfoxide. Heat the reaction mixture to about 150° centigrade and stir for about one hour. Cool the mixture to room temperature and add one-half liter of chloroform. Add the chloroform mixture into two liters of saturated salt solution. Separate the chloroform layer and extract the aqueous solution with several small portions of chloroform. Wash the combined chloroform extracts with saturated salt solution and distill off the chloroform. The residue, 1-methyl-3-cyanopyrrolidine, is purified by vacuum distillation. It boils at 92–93° centigrade at 23 mm./Hg. Its picrate melts at 204–205° centigrade.

Example 2.—1-ethyl-3-cyanopyrrolidine

Starting with 1-ethyl-3-chloropyrrolidine and using the method of Example 1, 1-ethyl-3-cyanopyrrolidine, boiling at 102–104° centigrade at 23 mm./Hg, is prepared. Its picrate melts at 140–141° centigrade.

PREPARATION OF 1-BENZYL-3-CHLORO-PYRROLIDINE

Dissolve 1 mol of 1-benzyl-3-pyrrolidinol in dry benzene. Slowly add, with stirring, 2 mols of thionyl chloride and heat to 65–70° for one hour. Reflux until the internal temperature of the reaction mixtures stabilizes. Cool and crystallize the product. Filter the 1-benzyl-3-chloropyrrolidine hydrochloride and wash with cold benzene until the color is removed. The material has a melting point of 140–142° centigrade. To obtain the free base suspend the hydrochloride salt in ether and treat with alkali. Distill the ethereal solution and obtain 1-benzyl-3-chloropyrrolidine, boiling at 132° at 7 mm./Hg.

PREPARATION OF 3-CHLOROPYRROLIDINE

Suspend 1 mol of 1-benzyl-3-chloropyrrolidine hydrochloride (supra) in isopropyl alcohol. Hydrogenate over 15% Pd/C catalyst at a temperature of about 60–70° and at two to five p.s.i. hydrogen. Isolate the product by concentrating to a small volume and recrystallizing. After recrystallization from isopropyl alcohol, 3-chloropyrrolidine hydrochloride is obtained; melting point 111–113° centigrade. The free base is liberated from ethereal solution by the addition of sodium hydroxide. The free base has a boiling point of 68–88° centigrade at 100 mm./Hg.

Example 3.—3-cyanopyrrolidine

Suspend 1.1 mols of sodium cyanide in dimethylsulfoxide at 90° centigrade and add to the suspension slowly one mol of 3-chloropyrrolidine. Upon completion of the addition, heat the mixture (150–160° centigrade) for twenty minutes. Cool and add two vols of chloroform, previously cooled to 5° centigrade, and pour this mixture into a saturated salt solution. Separate the chloroform layer from the aqueous layer. Extract the aqueous layer with pure chloroform. Combine the chloroform extracts with the decanted chloroform layer and wash the combined chloroform solution with saturated salt solution. Remove the chloroform by distillation and vacuum distill the residue. The purified 3-cyanopyrrolidine boils at 115–120° centigrade at 50 mm./Hg.

Example 4.—1-benzyl-3-cyanopyrrolidine

Using the procedure of Example 3, 1-benzyl-3-chloropyrrolidine is reacted with a 20% excess of sodium cyanide in dimethylsulfoxide to yield 1-benzyl-3-cyanopyrrolidine having a boiling point of 120° centigrade at 0.4 mm./Hg.

Example 5.—1-phenyl-3-cyanopyrrolidine

In the manner of Example 4, 1-phenyl-3-pyrrolidinol (YU. A. Arbuzov et al., Proc. Acad. Sci. U.S.S.R. Div. Chim. Sci., 1952, 766) is converted to 1-phenyl-3-cyanopyrrolidine.

Example 6.—1-methyl-3-n-butyl-3-cyanopyrrolidine

To a solution of 0.1 mol of sodamide in liquid ammonia (prepared by adding sodium to liquid ammonia), add 0.1 mol of 1-methyl-3-cyanopyrrolidine (Example 1) and then 0.1 mol of n-butyl iodide. Slowly add toluene to the reaction mixture and permit the ammonia to evaporate. Reflux the toluene-suspended mixture until the black sodamide color disappears (about six hours). Cool and add water to remove the inorganic salts. Separate the toluene layer from the aqueous layer. Extract the aqueous layer with successive portions of toluene and combine the toluene extracts with the toluene layer and distill off the toluene. Purify the residue by vacuum distillation. The purified 1-methyl-3-n-butyl-3-cyanopyrrolidine has a boiling point of 136° centigrade at 25 mm./Hg. The picrate of this material melts at 158–160° centigrade.

Example 7.—1-methyl-3-n-propyl-3-cyanopyrrolidine

By substituting isopropyl iodide for the n-butyl iodide of Example 6, 1-methyl-3-isopropyl-3-cyanopyrrolidine having a boiling point of 78–79° centigrade at 5. mm./Hg is obtained. The picrate of this material has a melting point 221–223° centigrade.

Example 8.—1-methyl-3-benzyl-3-cyanopyrrolidine

By substituting benzyl iodine for the n-butyl iodide of Example 6, the 1-methyl-3-benzyl-3-cyanopyrrolidine is obtained. This material has a boiling point of 134–136° centigrade at 2 mm./Hg. Its picrate has a melting point of 176–177° centigrade. In the same manner, other 1-lower-alkyl-3-benzyl-3 - cyanopyrrolidines are produced from the appropriate 1-lower-alkyl-3-cyanopyrrolidine starting materials.

Example 9.—1-methyl-3-(1'-methyl-3'-pyrrolidyl)-3-cyanopyrrolidine

By substituting 1-methyl-3-pyrrolidinyl bromide for the n-butyl iodide of Example 6, the 1-methyl-3-(1'-methyl-3'-pyrrolidyl)-3-cyanopyrrolidine is obtained. It boils at 120–126° centigrade at 8 mm./Hg and its picrate melts at 232–233° centigrade. In the same manner other 1-loweralkyl-3-(1'-lower-alkyl-3'-pyrrolidyl)-3-cyanopyrrolidines are produced from the appropriate 1-lower-alkyl-3-cyanopyrrolidine starting material.

*Example 10.—1-methyl-3-cyclopentyl-3-cyanopyrrolidine*

By substituting cyclopentyl iodide for the n-butyl iodide of Example 6, 1-methyl-3-cyclopentyl-3-cyanopyrrolidine is obtained having a boiling point of 106–109° centigrade at 5 mm./Hg. Its picrate melts at 205–206° centigrade. In the same manner, other 1-lower-alkyl-3-cyclopentyl-3-cyanopyrrolidines are produced from the appropriate 1-lower-alkyl-3-cyanopyrrolidine starting material.

*Example 11.—1-methyl-3-(2-dimethylaminoethyl)-3-cyanopyrrolidine*

By substituting 2-dimethylaminoethyl chloride hydrochloride for the n-butyl iodide of Example 6, the 1-methyl-3'-(2-dimethylaminoethyl)-3-cyanopyrrolidine is obtained, having a boiling point 110–112° centigrade at 6 mm./Hg. Its picrate melts at 148–150° centigrade.

By substituting other diloweralkylamino lower-alkyl chloride hydrohalides for the 2-dimethylaminoethylchloride hydrochloride of Example 11, additional 1-methyl-3'-(dilower-alkylaminolower-alkyl)-3-cyanopyrrolidines are prepared. By substituting other 1-lower-alkyl-3-cyanopyrrolidines for the 1-methyl-3-cyano-pyrrolidine used in Example 6, additional 1-lower-alkyl-3'-(di-lower-alkylaminolower-alkyl)-3-cyanopyrrolidines are prepared.

The compounds of this example, the 1-lower-alkyl-3-(dilower-alkylaminolower-alkyl)-3-cyanopyrrolidines, are useful in the preparation of local anesthetics, antispasmodics, and central nervous system drugs by conversion to the corresponding 1 - lower-alkyl-3-dilower-alkylaminoloweralkyl-3-pyrrolidinemethanol or carboxylic acid in the manner previously disclosed and further reaction thereof according to Feldkamp, Cavalla, or Ekenstam, also as already disclosed hereinbefore.

PREPARATION OF 1-METHYL-3-AMINOMETHYL-PYRROLIDINE

Shake 1-methyl-3-cyanopyrrolidine with anhydrous sodium acetate, actic anhydride and Raney nickel in a pressure hydrogenator. Feed hydrogen at 2–5 p.s.i. Maintain the vessel temperature at about 50° centigrade until the hydrogen up-take ceases. Filter the reaction mixture from the catalyst and distill the liquid. The recovered 1-methyl-3-acetylaminomethylpyrrolidine boils at 104–106° centigrade at 0.3 mm./Hg.

Reflux 1-methyl-3-acetylaminomethylpyrrolidine with two equivalents of sodium hydroxide (dissolved in water) for three hours. Acidify the mixture with hydrochloric acid and evaporate to dryness. Add 50% sodium hydroxide solution to the dry residue and extract with ether. Distillation of the ether residue yields 1-methyl-3-aminomethylpyrrolidine, which boils at 72–76° centigrade at 0.3 mm./Hg.

PREPARATION OF 1-METHYL-3-HYDROXYMETHYLPYRROLIDINE

To a suspension of either the 1-methyl-3-aminomethylpyrrolidine or the 1-methyl-3-acetylaminomethylpyrrolidine in hydrochloric acid add an equivalent amount of sodium nitrite in small portions (2 mol equivalents are needed if the acetylated compound is used). Small amounts of sodium bromide catalyze this reaction and may be added with the sodium nitrite. When the diazotization is completed, the resultant solution is warmed until the evolution of nitrogen ceases. The solution is then evaporated to dryness and the free base liberated from the salt by the addition of a 50% solution of sodium hydroxide. The ether is evaporated and the 1-methyl-3-hydroxymethylpyrrolidine boils at 90–95 degrees centigrade at 12 mm./Hg.

*Example 13.—1-methyl-3-cyclohexyl-3-cyanopyrrolidine*

By substituting cyclohexyl bromide or iodide for the cyclopentyl iodide of Example 11, the above-identified product is prepared.

Various modifications and equivalents will be apparent to one skilled in the art and may be made in the compounds, compositions, methods, and procedure of the present invention without departing from the spirit or scope thereof, and it is therefore to be understood that the invention is to be limited only by the scope of the appended claims.

We claim:
1. 1 lower-alkyl-3-cyanopyrrolidine, wherein the lower-alkyl group has a maximum of six carbon atoms.
2. 1-methyl-3-cyanopyrrolidine.
3. 1-ethyl-3-cyanopyrrolidine.
4. 1-benzyl-3-cyanopyrrolidine.
5. 1-phenyl-3-cyanopyrrolidine.
6. 1 - lower alkyl-3-(dilower-alkylamino-loweralkyl)-3-cyanopyrrolidine.
7. 1 - methyl-3-(2-dimethylaminoethyl)-3-cyanopyrrolidine.
8. 1-lower-alkyl-3-benzyl-3-cyanopyrrolidine.
9. 1-methyl-3-benzyl-3-cyanopyrrolidine.
10. 1 - lower-alkyl - 3-(1'-lower-alkyl-3'-pyrrolidyl)-3-cyanopyrrolidine.
11. 1 - methyl-3-(1'-methyl-3'-pyrrolidyl)-3-cyanopyrrolidine.
12. 1-lower-alkyl-3-cyclopentyl-3-cyanopyrrolidine.
13. 1-methyl-3-cyclopentyl-3-cyanopyrrolidine.
14. A compound of the formula:

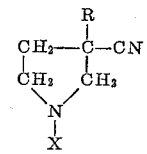

wherein R is selected from the group consisting of hydrogen, cyclopentyl, cyclohexyl, benzyl, phenethyl, dilower-alkylaminolower-alkyl, and 1'-lower-alkyl-3'-pyrrolidyl,
wherein X is selected from the group consisting of loweralkyl, cyclopentyl, cyclohexyl, phenyl, naphthyl, tolyl, xylyl, benzyl and phenethyl,
lower alkyl in all cases being of up to a maximum of six carbon atoms.

No references cited.

ALEX MAZEL, *Primary Examiner.*

MARY U. O'BRIEN, *Assistant Examiner.*